United States Patent Office 3,258,444
Patented June 28, 1966

3,258,444
GLASS BASE COATED WITH AN ACID HYDRO-
LYZED POLYSILANOL, THE METHOD OF COAT-
ING, THE COATING COMPOSITION, AND THE
METHOD OF PREPARING THE COMPOSITION
Thomas R. Santelli, Sylvania, Ohio, assignor to Owens-
Illinois Glass Company, a corporation of Ohio
No Drawing. Filed July 31, 1964, Ser. No. 386,748
16 Claims. (Cl. 260—30.4)

This is a continuation-in-part of application Serial Number 128,956 filed August 3, 1961, and now abandoned.

This invention relates to solutions of substantially saturated polysilanols in organic solvents; and to a method of preparation. Still further, this invention relates to forming a lubricious and water-repellent surface on articles, particularly siliceous articles such as glass articles. In still another aspect, this invention relates to glass articles containing such polysilanol coatings.

In certain uses of materials such as metal and glass objects and glass fibers, it is desirable to provide a water-repellent or lubricious surface on the articles or fibers. For instance, it is desirable to have a lubricious coating on glass containers to minimize surface damage when two containers rub together in handling. It is also desirable to have an imprevious coating on the inside of glass containers in certain instances to prevent chemical leaching by the contents of the containers. The basic hydrolysis products of vinyltrialkoxysilanes have been employed to coat surfaces, especially glass surfaces, but in the various methods proposed heretofore, the coating will contain alkali or careful steps must be taken to remove the alkali before the coating step or after the coating step.

As disclosed in my co-pending application, Serial Number 126,500 filed July 25, 1961, there has also been developed a method for producing basic aqueous solutions of the hydrolysis products of the vinyl polymers of vinyltrialkoxysilanes. As noted in my said co-pending application, the basic hydrolysis product is insoluble in most organic solvents, such as ethanol and acetone. It was therefore particularly surprising to discover that the acid hydrolysis products, prepared according to the present invention, are all readily soluble in organic solvents such as alcohol and acetone.

It is therefore an important object of the present invention to provide a durable, lubricious, and water-repellent polymeric coating on surfaces of articles, and a method for producing such coatings. It is a further object of the invention to provide new polymer solutions and a method for producing same.

Other objects, as well as aspects and advantages, of the invention will become apparent from a study of the following specification.

In the present invention, the starting material is a polymer of a vinyltrialkoxysilane. According to the method of the present invention, such a polymer is dissolved in a solvent which will dissolve both the polymer and at least an appreciable amount of water. Acidic water is added in excess of 1.0 mole of water for each equivalent weight of alkoxy groups contained in the polymer. Hydrolysis of alkoxy groups is effected to form alkanols and silanol groups. Hydrolysis can proceed at room temperature, but elevated temperatures are usually employed to accelerate the hydrolysis. The resulting solution of the hydrolyzed polymer of the vinyltrialkoxysilane is stable for appreciable lengths of time and thus can be employed to treat surfaces by dipping, spraying, brushing, or the like. Thereafter, the solvent is removed from the solution and this is effective to produce a tack-free, fully polymerized film or coating on the surface of an article treated.

During the solvent removal step, condensation of the silanol groups to form polysiloxane linkages accrues so that the coating becomes hard and non-tacky and insoluble in organic solvents.

Solvent removal temperatures are usually in the range from about 100–350° F., although higher or lower temperatures than these can be used. Care must be taken, however, not to pyrolyze the coatings by using excessively high temperatures.

It is believed that the tenacity of the bond to glass or a siliceous surface is due to a reaction of at least part of the silanol groups with —OH groups in the siliceous surface. The coatings have a polymeric hydrocarbon backbone derived from the polymerized vinyl groups and owe their high water-repellency and lubricity to this hydrocarbon polymer structure.

The polymerization of the vinyltrialkoxysilanes is not per se a part of the present invention, and can be effected by any suitable method. In any case, the prepolymers are made from vinyltrialkoxysilane of the formula

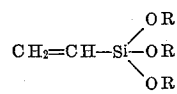

wherein each R is selected from methyl, ethyl, and propyl, and the monomer is polymerized by addition polymerization through the vinyl group. Polymerization is easily effected, for example, by bulk polymerization of the monomer at temperatures of about 100–160° C. using 2–8 weight percent of an organic peroxy compound, such as ditertiarybutylperoxide. Suitable monomers include vinyltrimethoxysilane, vinyltriethoxysilane, and vinyltripropoxysilane.

The pH of the acidified water added to the mutual solvent need not be controlled within any critical limits in the present process, but the pH does need to be below 7. The usual values of acidity are a hydrogen ion concentration from $10^{-5}$ Normal to 6 Normal.

The amount of the mutual solvent employed is enough such that both the starting material prepolymer and the aqueous acid employed are soluble in the solvent. The specific amounts depend on the particular solvent, the amount of excess acidified water employed, and somewhat on the particular prepolymer starting material used.

The optimum amount of solvent can be determined in any given case by routine test. I have usually employed an amount of solvent such that the weight percent of the starting prepolymer in the solvent is 25 weight percent or less. Usually the concentration is at least about 0.05 weight percent.

No particular advantage is gained by using larger excesses of water, say as much as 500 or 600 percent of the stoichiometric amount; in any case, the volume ratio of organic solvent to water employed is usually more than 5:1 and in most cases over 20:1.

In most cases, when employing the resulting solution of the hydrolyzed prepolymer to coat surfaces, rather thin coatings are desired and these are therefore deposited from dilute solutions ranging from 0.05 to 5 weight percent of polymer in the solution (calculated as poly(vinylsilanol)). When such dilute solutions are employed, it is convenient to start with correspondingly dilute solutions of the initial unhydrolyzed polymer. Representative organic solvents applicable include diethyl ether, acetone, diethylene glycol monoethyl ether, diethylene glycol monobutyl ether, 1-propanol, and 2-propanol. Usual solvents employed are polar solvents containing only C, H and O. Diethylene glycol, dioxane, trioxane, methylethylketone and ethanol also can be used.

EXAMPLES

A number of runs have been made that illustrate the ranges of concentrations, acidities, and temperatures of hydrolysis applicable to use in the invention. These runs are summarized in Table I, below. The examples, however, are merely illustrative and should not be considered as limiting on the total scope of the invention.

The acidified water can contain either organic acids, such as acetic acid, or mineral acids, such as sulfuric or hydrochloric acids.

For use in the various runs, practical grade vinyltriethoxysilane was redistilled to obtain pure vinyltriethoxysilane, water-white, boiling at 152–154° C.

To 400 ml. of this monomer was added 4 grams of ditertiarybutylperoxide, and the mixture was slowly heated, with stirring, over a period of about one hour to a temperature of about 135° C., at which time a vigorous exothermic reaction occurred and the viscosity suddenly increased. This elevated temperature was held for a few minutes and the reaction mixture was cooled. The poly(vinyltriethoxysilane) produced was a very viscous liquid at room temperature, and infra-red analyses showed an absence of vinyl groups, indicating substantially 100% conversion by polymerization through the vinyl groups.

The poly(vinyltriethoxysilane) so produced was used in Examples I–V, shown in Table I. The table shows the amounts of reaction ingredients and the time of reflux at the approximate boiling point of acetone.

It will be noted that Examples IV and V were not refluxed, and hydrolysis occurred rather rapidly at room temperature.

In each run, the acid used was sulfuric.

TABLE I

| Example | Poly(vinyltriethoxysilane), grams | $H_2O$, ml. | Normal acidity | Mole ratio, $H_2O$/silane | Acetone, ml. | Reflux, hrs. |
|---|---|---|---|---|---|---|
| I | 10 (.05 mole). | 3.3 (.18 mole). | 0.5 | 3.6/1 | 90 | 0.1 |
| II | 1.5 (.0075 mole). | .3 (.017 mole). | 0.01 | 2.2/1 | 177 | 4 |
| III | 15 (.075 mole). | 3 (.166 mole). | 0.01 | 2.2/1 | 177 | 4 |
| IV | 1.5 (.0075 mole). | 2 (.11 mole). | 6.0 | 14.6/1 | 177 | 0 |
| V | .75 (.00375 mole). | 1 (.055 mole). | 0.3 | 15.2/1 | 177 | 0 |

Observations

I. Clear solution produced.
II. Clear solution produced.
III. Slightly hazy solution produced.
V. Hydrolyzed at room temperature for 5–10 minutes. Solution produced was slightly hazy.
V. Clear solution produced.

The reaction products made in accordance with the runs of the above examples were all single phase solutions of saturated polysilanol in acetone. These solutions were used to coat clean glass slides. By so operating, the characteristics of films produced from the reaction product solutions were determined.

The film characteristics from each of the runs are set out below.

Example:                                               Film
    I  -------- Clear, non-tacky.
    II  ------- do.
    III  ------ do.
    IV  ------ Film was slightly hazy but non-tacky.
    V  ------- do.

From the foregoing, it will be observed that tack-free films were produced in all cases. The coatings rendered the slides water-repellent in all cases. Also, in all cases, the coatings were lubricious.

The durability characteristics of the films were determined by boiling in hot water and then alcohol for one hour. In all cases, the properties of non-tackiness, water-repellency, and lubriciousness were retained after such treatment. Also, the properties were retained after heating for four hours at 160° C.

CONTROL RUN #1.—NO WATER

In this run, poly(vinyltriethoxysilane) was refluxed in acetone without addition of water.

Here, 10 grams poly(vinyltriethoxysilane) was added to 90 ml. of acetone, without any water or acid.

After at least one hour of reflux, the solution was withdrawn and used to coat glass slides.

The slides when air evaporated, were tacky and sticky indicating that no hydrolysis or other action of the poly(vinyltriethoxysilane) had taken place.

CONTROL RUN #2.—EQUIMOLAR RATIOS OF POLY(VINYLTRIETHOXYSILANE) AND WATER

A run was made wherein the following ingredients were employed:

10.6 grams, (.05 mole) poly(vinyltriethoxysilane)
.9 ml. (18 drops; .05 mole) acidified water at pH of 4 to 5
177 ml. dry acetone
Mole ratio 1:1.

The poly(vinyltriethoxysilane) was dissolved in the acetone, and then the acidified water was added. Thereafter, the reaction was heated to reflux.

After one hour of reflux, some of the solution was withdrawn and two slides were coated and air evaporated. The films produced on each slide were tacky.

After four hours of reflux, additional solution was withdrawn and two more slides were coated. These were also air evaporated and found to be as tacky as the samples produced from the one hour reflux.

EXAMPLE VI

A run was made wherein the mole ratio of poly(vinyltriethoxysilane) to water was 1:2. In this run, the following ingredients were employed:

10.6 grams (.05 mole) of poly(vinyltriethoxysilane)
1.8 ml. (36 drops; 0.1 mole) acidified water pH 4–5
177 ml. dry acetone.

The poly(vinyltriethoxysilane) was dissolved in the acetone and the acidified water was added. Thereafter, the reaction was refluxed at 55° C.

After one hour of reflux, some of the solution was withdrawn and two slides were coated and air evaporated. The films were very slightly tacky.

After four hours of reflux, additional reaction solution was withdrawn and two more slides were coated. These were also air evaporated. In this instance, tack-free films were produced.

The solution was partially cloudy after four hours of reflux, indicating good stability and shelf-life.

EXAMPLE VII.—MOLE RATIO OF POLY(VINYLTRIETHOXYSILANE) TO WATER 1:3

In this run, the following ingredients were employed:

10.6 grams (.05 mole) poly(vinyltriethoxysilane)
2.7 ml. (.15 mole) acidified water 1 N HCl
177 ml. dry acetone.

The poly(vinyltriethoxysilane) was first dissolved in the acetone. Thereafter, the acidified water was added.

The mixture was just warmed on a hot plate to trigger the hydrolysis.

Several slides were coated and the acetone removed by air evaporation.

The coatings so produced were in all instances clear and tack-free.

Within 15 minutes, the reaction mixture began to cloud and haze. Several minutes later, the reaction mixture completely gelled. This example illustrates that hydrolysis is substantially autogenous to a completely gelled stage when larger amounts of acid are added, thus reducing shelf life of the reaction solution.

EXAMPLE VIII.—MOLE RATIO OF POLY(VINYL-TRIETHOXYSILANE) TO WATER 1:1.75

A run was made using the following ingredients:

10.6 grams (.05 mole) poly(vinyltriethoxysilane)
1.8 ml. (.1 mole) acidified water in 1 N HCl
177 ml. dry acetone.

The poly(vinyltriethoxysilane) and acetone were admixed and the acidified water added. The mixture was then stirred and merely warmed, on a hot plate.

Two slides were coated and the acetone removed by air evaporation.

Clear, hard coatings were produced.

Within 20 minutes following solution preparation, a slight haze began to develop in the reaction solution. After one hour, the reaction solution had completely gelled.

As will be evident to those skilled in the art, various modifications of this invention can be made or followed in the light of the foregoing disclosure and discussion without departing from the spirit and scope of the disclosure or from the scope of the claims.

What is claimed is:
1. In an article of manufacture,
   a glass surface,
   and a coating on said surface consisting essentially of a substantially saturated polysilanol, prepared by acid-hydrolyzing a polyvinylsilane made from a vinyltrialkoxysilane of the formula

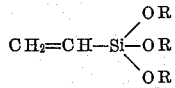

wherein R is selected from the group of methyl, ethyl, and propyl radicals.
2. The article of claim 1 wherein said vinyltrialkoxysilane is vinyltriethoxysilane.
3. In an article of manufacture,
   a siliceous body having a surface,
   and a coating on said surface consisting essentially of a substantially saturated polysilanol, prepared by acid-hydrolyzing a polysilane made from a vinyltrialkoxysilane of the formula

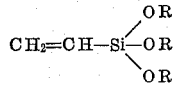

wherein R is selected from the group of methyl, ethyl, and propyl radicals.
4. The article of claim 3 wherein said vinyltrialkoxysilane is vinyltriethoxysilane.
5. In a method of rendering a siliceous surface water-repellent,
   the steps of,
   covering said surface with a solution in organic solvent of a saturated polysilanol, said saturated polysilanol being produced by complete acid catalyzed hydrolysis, in said organic solvent, of a prepolymer of a vinyltrialkoxysilane

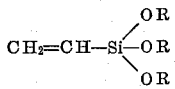

wherein R is selected from methyl, ethyl, and propyl radicals,
   and then air evaporating said organic solvent.

6. The method of claim 5 wherein said vinyltrialkoxysilane is vinyltriethoxysilane.
7. In an article of manufacture,
   a glass body having a surface,
   a coating on said surface consisting essentially of an air-dried solution of a saturated, reacted mixture of acidified water and polysilane in a common solvent, wherein the reactants were originally present in a theoretical mole ratio of at least 1.5 mole water to 1 mole polysilane,
   and wherein the polysilane was a polymer made from a selected one only vinyltrialkoxysilane of the formula

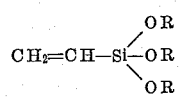

wherein R is selected from the group of methyl, ethyl, and propyl radicals.
8. In a method of preparing an organic solvent solution of a substantially saturated polysilanol, prepared by acid hydrolyzing a polysilane, the polysilane being made by polymerization of a selected monomeric vinyltrialkoxysilane of the formula

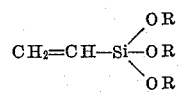

wherein R is selected from the group of methyl, ethyl, and propyl radicals,
   the steps of
   forming a single phase solution by admixing in an organic solvent capable of producing a single phase solution, said polysilane and at least sufficient water to hydrolyze the OR groups of said polysilane, the water being acidified to a pH below 7,
   and then hydrolyzing the OR groups of said polysilane to produce a single phase solution of polysilanol wherein the dissolved polymer contains OH substituents in place of the original OR substituents.
9. The invention of claim 8 wherein the solvent is a polar organic solvent containing carbon, hydrogen and oxygen.
10. The invention according to claim 8 wherein the solvent is selected from the group of diethyl ether, acetone, diethylene glycol, dioxane, trioxane, methylethylketone, ethanol, diethylene glycol monoethyl ether, diethylene glycol monobutyl ether, 1-propanol, and 2-propanol.
11. The method as defined in claim 8 wherein the vinyltrialkoxysilane starting material is vinyltriethoxysilane.
12. In a method of forming a coating on a glass surface, of saturated polysilanol, prepared by acid-hydrolyzing a polysilane, the polysilane being made from a selected one only vinyltrialkoxysilane of the formula

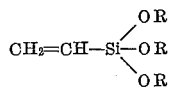

wherein R is selected from the group of methyl, ethyl, and propyl radicals,
   the steps of
   applying a single phase solution consisting essentially of the acid-hydrolyzed polysilanol and an organic solvent to the glass surface,
   and removing the solvent phase to leave the substantially saturated polymer coupled to the glass by polysiloxane linkages.
13. In a solution,
   a solute consisting essentially of a saturated polysilanol, prepared by acid hydrolyzing a polysilane, the polysilane being made from a selected monomeric vinyl-trialkoxysilane of the formula

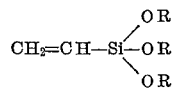

wherein R is selected from the group of methyl, ethyl, and propyl radicals,
the polysilanol containing OH substituents in place of the original OR substituents of the polysilane,
and an organic solvent, dissolving the acid-hydrolyzed polysilanol to form a single phase solution.

14. In a method of preparing a single phase solution of an acid-hydrolyzed, saturated polysilanol, made from a selected polymerized monomeric silane of the formula

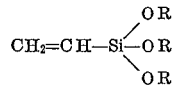

wherein R is selected from the group of methyl, ethyl, and propyl radicals,
the steps of
dissolving said polymer and an excess of acidified water over the stoichiometric amount of water required to hydrolyze the alkoxy groups of said polymer in an organic solvent to form a single phase solution,
and hydrolyzing alkoxy groups of said polymer under the prevailing acid conditions,
said solvent being a polar solvent containing only carbon, hydrogen, and oxygen.

15. In a method of forming a coating having water-repellent properties on a siliceous surface,
the steps of
applying on said surface a coating of a solution of a saturated, acid-hydrolyzed polysilane made from a polymer of a selected one only vinyltrialkoxysilane of the formula

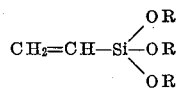

wherein R is selected from the group of methyl, ethyl, and propyl radicals, in an organic solvent,
and drying said coating to form a non-tacky film having a polymeric hydrocarbon backbone and also containing polysiloxane linkage connections to said siliceous surface,
said solvent being a polar solvent containing only carbon, hydrogen, and oxygen.

16. A product comprising a solution of a saturated, acid-hydrolyzed polysilanol in an organic solvent,
the polysilanol being made from a polymer of a monomeric vinyltrialkoxysilane of the formula

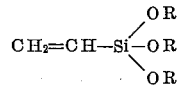

wherein R is selected from the group of methyl, ethyl, and propyl radicals,
and said solvent being a polar solvent containing only carbon, hydrogen, and oxygen.

References Cited by the Examiner
UNITED STATES PATENTS
2,763,629 9/1956 Gottfurcht.
2,974,063 3/1961 Bobear et al. _____ 117—126 X RICHARD D. NEVIUS, *Primary Examiner.*
JOSEPH B. SPENCER, *Examiner.*